US008149265B2

(12) United States Patent
Smalley et al.

(10) Patent No.: US 8,149,265 B2
(45) Date of Patent: Apr. 3, 2012

(54) HOLOGRAPHIC VIDEO DISPLAY SYSTEM

(75) Inventors: Daniel E. Smalley, Cambridge, MA (US); Quinn Y. J. Smithwick, Cambridge, MA (US); V. Michael Bove, Jr., Wrentham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1095 days.

(21) Appl. No.: 11/837,517

(22) Filed: Aug. 11, 2007

(65) Prior Publication Data

US 2009/0040294 A1 Feb. 12, 2009

(51) Int. Cl.
*G03H 1/08* (2006.01)
(52) U.S. Cl. ........................................................ 348/40
(58) Field of Classification Search .................... 348/40; 359/1, 9, 22; 382/232
See application file for complete search history.

(56) References Cited

U.S. PATENT DOCUMENTS

| | | | | |
|---|---|---|---|---|
| 2,161,299 | A | | 6/1939 | Jeffree |
| 3,761,156 | A | * | 9/1973 | Mohon et al. ................... 434/42 |
| 4,602,843 | A | * | 7/1986 | Glaser-Inbari ................... 359/15 |
| 4,907,851 | A | * | 3/1990 | Marhic ............................. 385/24 |
| 5,172,251 | A | | 12/1992 | Benton et al. |
| 5,283,672 | A | * | 2/1994 | Hong et al. ........................ 359/7 |
| 5,303,043 | A | | 4/1994 | Glenn |
| 5,341,229 | A | * | 8/1994 | Rowan ............................. 359/10 |
| 6,040,928 | A | * | 3/2000 | Popovich ......................... 359/15 |
| 6,175,431 | B1 | * | 1/2001 | Waldern et al. ................. 359/15 |
| 6,229,561 | B1 | * | 5/2001 | Son et al. ........................ 348/42 |
| 6,301,027 | B1 | * | 10/2001 | Popovich ......................... 359/15 |
| 6,765,704 | B2 | * | 7/2004 | Drinkwater ........................ 359/2 |
| 6,819,469 | B1 | * | 11/2004 | Koba ............................. 359/290 |
| 7,199,911 | B2 | * | 4/2007 | Hudson et al. .................... 359/2 |
| 7,554,893 | B2 | * | 6/2009 | Kanaoka et al. ............... 369/103 |

OTHER PUBLICATIONS

Bove, V.M., Jr., et al., Real-Time Holographic Video Images with Commodity PC Hardware, Proc. SPIE Stereoscopic Displays and Applications, Mar. 22, 2005, pp. 255-262, vol. 5664A, Publisher: SPIE.
Choi, Hyunhee, et al., Recent Improvement of Pulsed Laser Electroholographic System, Proc. of SPIE: Practical Holography XVI and Holographic Materials VIII, 2002, pp. 76-82, vol. 4659, Publisher: SPIE.
Lee, H. W., The Scophony Television Receiver, Nature, Jul. 9, 1938, pp. 59-62, vol. 142, No. 3584, Published in: US.
Proklov, V.V. et al., Multichannel Waveguide Devices Using Collinear Acoustooptic Interaction, Proc. IEEE 1992 Ultrasonics Symposium, 1992, pp. 173-178, Publisher: IEEE, Published in: US.

(Continued)

*Primary Examiner* — David Eng
(74) *Attorney, Agent, or Firm* — Norma E. Henderson

(57) ABSTRACT

A holographic video display comprises a monochromatic light source, a video signal generator, guided-wave acousto-optic modulators for diffracting light according to signals received from the video signal generator, a vertical scanning subsystem, and an optical path between the acousto-optic modulator and the vertical scanning subsystem. The optical path preferably comprises a Bravais lens system, first and second Fourier transform lens systems, and at least one holographic optical element or stationary mirror of continuous helical shape. In a method for generating a holographic image, monochromatic light is provided to at least one guided-wave acousto-optic modulator, the received light is diffracted according to a video signal, the guided-wave modulator aperture is scanned to produce a holo-line, the motion of the diffraction pattern is undone to render the holo-line stationary, the guided-wave modulator aperture is demagnified to create a wide field of view, and the holo-lines are tiled vertically to create the image.

23 Claims, 2 Drawing Sheets

OTHER PUBLICATIONS

Sato, K., et al., Reconstruction of Color Images at High Quality by a Holographic Display, Proc. SPIE: Practical Holography XX, Mar. 2006, pp. 254-262, vol. 6136, Publisher: SPIE, Published in: San Jose, CA.

Slinger, C., et al., Recent Developments in Computer-Generated Holography: Toward a Practical Electroholography System for Interactive 3D Vis, Proc. SPIE Practical Holography XVIII, Jun. 29, 2004, pp. 27-41, vol. 5290, Publisher: SPIE.

Son, Jung-Young et al., Pulsed Laser Holographic Video, Proc. SPIE, Mar. 1996, pp. 24-28, vol. 2652, Publisher: SPIE.

St.-Hilaire, P., et al., Electronic Display System for Computational Holography, Proc. SPIE Practical Holography IV, May 1, 1990, pp. 174-182, vol. 1212, Publisher: SPIE.

Tsai, Chen S., Guided-Wave Acousto-Optics, Introduction, Springer Series in Electronics and Photonics, 1990, pp. 1-9, vol. 23, Publisher: Springer-Verlag, Published in: Berlin, Germany.

Tsai, C. S. et al., Guided-Wave Two-Dimensional Acousto-Optic Scanner Using Proton-Exchanged Lithium Niobate Waveguide, Fiber and Integrated Optics, 1998, pp. 157-166, vol. 17, Publisher: Taylor & Francis.

Watlington, J.A., et al., A Hardware Architecture for Rapid Generation of Electro-Holographic Fringe Patterns, Proc. SPIE Practical Holography IX, Apr. 12, 1995, pp. 172-183, vol. 2406, Publisher: SPIE.

St.-Hilaire, Pierre, Scalable Optical Architectures for Electronic Holography, Sep. 1994, pp. 1-110, Publisher: Massachusetts Institute of Technology, Published in: Cambridge, MA.

* cited by examiner

HOLOGRAPHIC VIDEO DISPLAY SYSTEM

FIELD OF THE TECHNOLOGY

The present invention relates to holographic devices and, in particular, to a holographic video display based on guided-wave acousto-optic devices.

BACKGROUND

A fundamental engineering challenge in designing a holographic video display is achieving a high enough space-bandwidth product to meet the image size and view angle requirements of the viewer. In general, a large view angle is possible only with very small diffraction fringes (and thus small pixels), while a large image requires a large light modulator. In simple terms, what is therefore necessary is a massive number of very small pixels. In some cases it is possible to use optics to trade off one of these for the other, such as, for example, by magnifying a display that is higher-resolution than needed or by demagnifying a large modulator to get a small enough effective pixel size, but passive optics cannot simultaneously increase both size and angle.

Because of the practical limitations on devices that can currently be fabricated, it is commonly necessary to use either, or both, scanning (re-using a smaller device for more than one region of the image) or tiling (using multiple copies of a small device) [see, for example, K. Sato, A. Sugita, M. Morimoto, and K. Fujii, "Reconstruction of Color Images at High Quality by a Holographic Display," Proc. SPIE Practical Holography XX, 6136, 2006; C. Slinger, C. Cameron, S. Coomber, R. Miller, D. Payne, A. Smith, M. Smith, M. Stanley, and P. Watson, "Recent Developments in Computer-Generated Holography: Toward a Practical Electroholography System for Interactive 3D Visualization," Proc. SPIE Practical Holography XVIII, 5290, pp. 27-41, 2004]. For example, Son, Shestak, et al. try to solve the problem of making the scan line stationary while the pattern is traveling across the light modulator by using a pulsed laser, in order to obtain a "snapshot" of the moving pattern. The resulting scan line is too short, so six snapshots are pasted together end-to-end using six mirrors in a stepped arrangement [J-Y. Son, Jung-Young, S. A. Shestak, S-K. Lee, and H-W. Jeon, "Pulsed laser holographic video", Proc. SPIE, vol. 2652, pp. 24-28].

A prior 2-D diffractive display architecture, dating from the 1930s, is called the Scophony system. In a 2-D Scophony display, an electrical sinusoidal oscillation is converted to a compression wave that changes the index of refraction in some material and thus creates a sinusoidal phase grating. Amplitude-modulating this sinusoidal carrier with a video signal changes the amplitude of a diffracted beam of light, which is then scanned by rotating or oscillating mirrors to form a video image [H. W. Lee, "The Scophony Television Receiver," Nature, 142, 3584, pp. 59-62, 1938]. Besides the need for a monochromatic light source to enable sharp focus, the major limitation of a Scophony display system stems from the fact that the grating pattern is moving with the speed of sound through the diffractive material. To create a stable image, the diffracted light must therefore be imaged in a mirror moving in the opposite direction, a requirement that makes scaling such a system difficult.

Two earlier generations of displays developed by the MIT Media Laboratory were variations on the Scophony system. If a Scophony-type display is not driven with a single amplitude-modulated sinusoid, but rather with a superposition of many gratings at different frequencies, it can output light in multiple directions. The output of an acousto-optic modulator (AOM) can then be treated as one "holo-line" of a horizontal-parallax-only (HPO) holographic image. The first-generation MIT display, known as the "Mark I" [P. St.-Hilaire, S. A. Benton, M. Lucente, M. L. Jepsen, J. Kollin, and H. Yoshikawa, "Electronic Display System for Computational Holography," Proc. SPIE Practical Holography IV, 1212, pp. 174-182, 1990], is depicted in FIG. 1. As shown in FIG. 1, the Mark I is fundamentally a standard Scophony architecture, with light from laser light source 105 being diffracted by a 50 MHz bandwidth $TeO_2$ AOM 110 driven by a 32,768×192 raster. The video signal employed is multiplied by a 100 MHz sinusoid and lowpass filtered to retain the lower sideband. The view volume is 25 mm×25 mm×25 mm (W×H×D) and the view angle is 15°. The signal passes through transform lens 120, and then is scanned by vertical scanner 130 and horizontal scanner 140. Vertical scanner 130 is a galvanometer and horizontal scanner 140 is a polygonal mirror. Holographic image 150 is rendered through output lens 160. A Thinking Machines CM2 (not shown) performs the computation.

In order to scale up the image size so that both of a viewer's eyes could fit into the view zone with some added look-around, St.-Hilaire et al. increased the space-bandwidth product of the system by using 18 $TeO_2$ AOM channels in parallel, thus outputting a group of 18 adjacent scan lines, resulting in the "Mark II" architecture [P. St.-Hilaire, S. A Benton, M. Lucente, J. D. Sutter and W. J. Plesniak, "Advances in Holographic Video," Proc. SPIE Practical Holography VII, 1914, pp. 188-196, 1993] shown in FIG. 2. In FIG. 2, the light diffracted from laser light source 205 by AOMs 210 passes through transform lens 215 and toroidal lens pair 220 before being scanned by vertical scanner 230. Vertical scanner 230 moves in 18-line steps to scan out 144 lines, each having 262,144 samples. The view volume is 150 mm×75 mm×150 mm and the view angle is 30°. The signals then pass through vertical relay lenses 240, 245 to beamsplitter 250. Because of the difficulty of making a single horizontal scanner wide enough to meet the requirements, Mark II uses a synchronized linear array 260 of galvanometric scanners 265. Holographic image 270 is rendered through output lens 280. The 18 video channels were initially generated by a compact dataflow computer called Cheops [J. A. Watlington, M. Lucente, C. J. Sparrell, V. M. Bove, Jr., and I. Tamitani, "A Hardware Architecture for Rapid Generation of Electro-Holographic Fringe Patterns," Proc. SPIE Practical Holography IX, 2406, pp. 172-183, 1995], and in later work the display was driven by three dual-output PC video cards [V. M. Bove, Jr., W. J. Plesniak, T. Quentmeyer, and J. Barabas, "Real-Time Holographic Video Images with Commodity PC Hardware," Proc. SPIE Stereoscopic Displays and Applications, 5664A, 2005]. The use of parallel AOMs and a segmented horizontal scanner gives the Mark II a modular character that allows scale-up of the system, albeit at the expense of more video input channels and more synchronized mirror-drive circuitry.

One goal of research in holographic video has been constructing a display suitable for use by consumers. Unlike earlier systems, such a display must be at least standard television resolution, quiet, reliable, compact, manufacturable for at most a few hundred dollars, and capable of being driven by the graphics hardware of a PC or game console, rather than requiring specialized hardware. A vast amount of 3-D visual data now exists, particularly in the gaming world (though most is rendered for 2-D viewing), and three-dimensional displays could easily take advantage of this resource if they could be manufactured inexpensively. The widespread adoption of such displays would also spark innovation in 3-D capture of real-world scenes.

SUMMARY

In one aspect, the present invention is a holographic video display system that employs a guided-wave device to diffract light from a monochromatic light source. In a further aspect, the present invention employs a guided-wave device in conjunction with a stationary helical mirror or holographic optical element, so that the moving horizontal mirror of the prior art devices is not required.

In a preferred embodiment, the holographic video display system comprises at least one monochromatic light source, a video signal generator, at least one guided-wave acousto-optic modulator for diffracting light received from the light source according to at least one video signal received from the video signal generator, a vertical scanning subsystem, and an optical path for passing the diffracted light from the acousto-optic modulator to the vertical scanning subsystem. A preferred embodiment of the optical path comprises a Bravais lens system, a first Fourier transform lens system, at least one holographic optical element or stationary mirror of continuous helical shape, and a second Fourier transform lens system. In one preferred embodiment, the system is based on a lithium niobate guided-wave acousto-optic device, which provides twenty or more times the bandwidth of the tellurium dioxide bulk-wave acousto-optic modulators used in previous displays. The system architecture and the guided-wave device are preferably driven by a graphics chip.

In another aspect, the present invention is a method for displaying holographic images. In a preferred embodiment, monochromatic light is provided to at least one guided-wave acousto-optic modulator, the received light is diffracted according to at least one video signal, the guided-wave modulator aperture is scanned to produce a holo-line, the motion of the diffraction pattern is undone to render the holo-line stationary, the guided-wave modulator aperture is demagnified to create a wide field of view, and the holo-lines are tiled vertically to create the holographic image.

The present invention has been implemented as a new holo-video display architecture known as the "Mark III". It reduces the cost and size of a holo-video display, making it into an inexpensive peripheral to a standard desktop PC or game machine that can be driven by standard graphics chips. The novel display architecture of the present invention eliminates the high-speed horizontal scanning mechanism that has traditionally limited the scalability of Scophony-style video displays.

BRIEF DESCRIPTION OF THE DRAWINGS

Other aspects, advantages and novel features of the invention will become more apparent from the following detailed description of the invention when considered in conjunction with the accompanying drawings, wherein.

DETAILED DESCRIPTION

Figure 1:
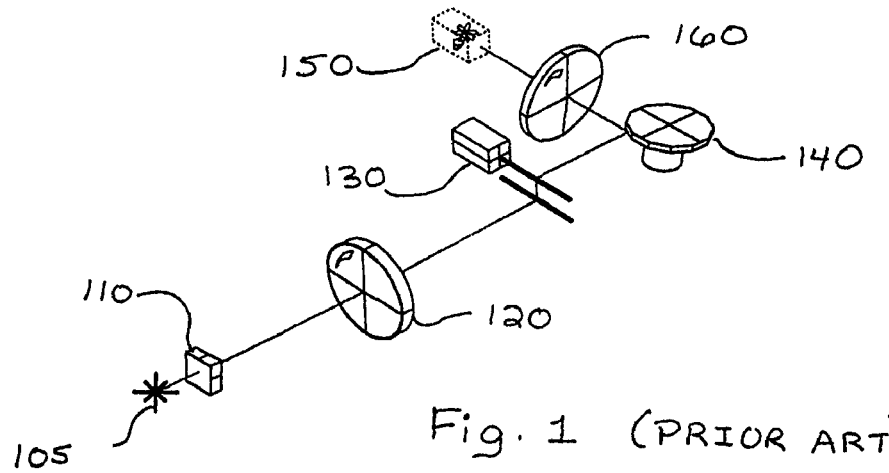
FIG. 1 is a schematic depicting the prior art Mark I architecture.
Figure 2:
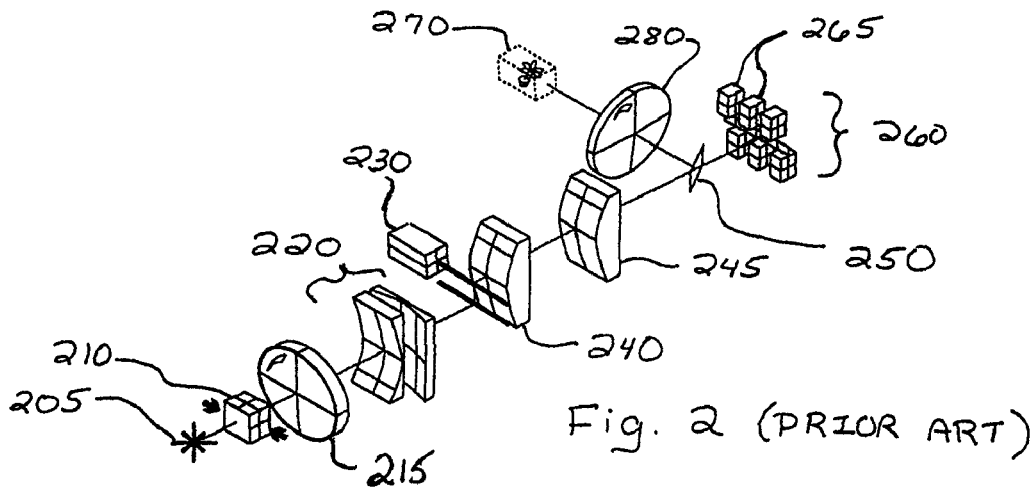
FIG. 2 is a schematic depicting the prior art Mark II architecture.

The present invention is a new holo-video display architecture, the preferred embodiment of which is known as the "Mark III". The present invention employs a guided-wave device to diffract light from a monochromatic light source. The architecture also eliminates the high-speed horizontal scanning mechanism that has traditionally limited the scalability of Scophony-style video displays, performing the function continuously with a helical mirror or a holographic optical element (HOE) and thereby replacing the moving horizontal mirror of the prior art devices. The system architecture and the guided-wave device are preferably driven by a graphics chip. In a preferred embodiment, the system employs lithium niobate guided-wave acousto-optic devices, which provide twenty or more times the bandwidth of the tellurium dioxide bulk-wave acousto-optic modulators of the previous displays. The basic approach used ithe present invention is also appropriate for the design of compact and inexpensive 2-D video projection applications.

Because the prior art Mark II has a modular architecture, that system may be scaled to allow very large view volumes. However, the Mark II system is already expensive and physically large (about the size of a dining table top), so a departure was made from a direct extrapolation of Mark II's design and instead the display of the present invention is centered on a single, inexpensive, very high bandwidth light modulator and a novel optical design that eliminates the horizontal mirror and as many other optical elements as possible. The result is a complete, packaged display system that is capable of being driven by one (dual-output) PC video card.

A light-modulation technology that is particularly suitable for use in the present invention is the guided-wave acousto-optic modulator (AOM), frequently also referred to as a guided-wave scanner (GWS) [C. S. Tsai (ed.), Guided-Wave Acousto-Optics, Springer-Verlag, Berlin, 1990]. A guided-wave scanner is easily made from a slab of lithium niobate ($LiNbO_3$) that has been acid-treated to create a subsurface waveguide through proton exchange and then patterned on the surface with aluminum transducers. This simple device may be produced in quantity at prices approaching those of the rather similar surface acoustic wave (SAW) devices currently on the market for a few dollars, can have over 1 GHz of usable bandwidth, can diffract light along two axes [V. V. Proklov and E. M. Korablev, "Multichannel Waveguide Devices Using Collinear Acousto-optic Interaction," Proc. IEEE 1992 Ultrasonics Symposium, pp. 173-178, 1992. This paper also references an earlier (1981) paper in Russian reporting on the authors' work in this area. See also C. S. Tsai, Q. Li, and C. L. Chang, "Guided-Wave Two-Dimensional Acousto-Optic Scanner Using Proton-Exchanged Lithium Niobate Waveguide," Fiber and Integrated Optics, 17, pp. 157-166, 1998], and can rotate the polarization of the diffracted light so that the undiffracted portion can be blocked with a polarizer. Although the vertical diffraction angle available is perhaps too small to be usable for the vertical scanning of a video display, it is applied in conjunction with holographic optical elements in the present invention to solve the horizontal scanning problem inherent in past Scophony-architecture displays.

The fundamental requirement for the optical design of the present invention is that the diffracted light from the modulator be placed at the correct position over time to present a proper display. The optics must scan the guided-wave scanner aperture to produce a holo-line, undo the motion of the diffraction pattern to render the holo-line stationary, demagnify the guided-wave scanner aperture to create a wide field of view, and tile the holo-lines vertically to create a raster image. In a preferred embodiment, the optics comprise a Bravais lens system, a modified telephoto Fourier transform system, two holographic optical elements (HOEs), a demagnifying transform lens, and a vertical scanning subsystem.

Figure 3:
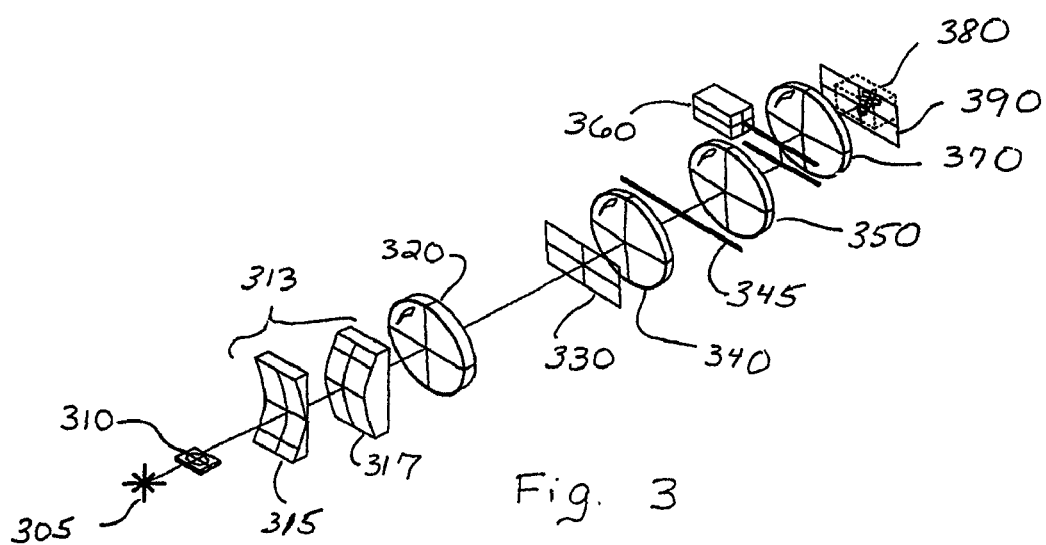
FIG. 3 is a schematic depicting a preferred embodiment of the architecture of the holographic video display system of the present invention.

FIG. 3 is a schematic depicting a simple embodiment of the architecture of the holographic video display system of the present invention. In FIG. 3, light from monochromatic laser 305 is diffracted by guided-wave AOM 310 through modified Bravais lens system 313. In the embodiment shown, Bravais lens system 313 comprises two lenses 315, 317, but other configurations known in the art would be suitable. The diffracted light then passed through a first Fourier transform lens system, depicted in this embodiment as telephoto horizontal transform lens 320, then through first holographic element (HOE) 330, a second Fourier transform lens system, which in this embodiment is a demagnifying horizontal transform lens 340, and second holographic element 345. The signal then passes to the vertical scanning subsystem comprising, in the embodiment of FIG. 3, vertical scan transform lens 350, vertical scanner 360, and vertical scan output lens 370. Holographic image 380 is then rendered through diffuser 390.

Diffractive displays require illumination by a monochromatic light source such as a laser, or multiple such sources if a full-color image is desired. In the preferred embodiment, the light modulator is illuminated by a semiconductor laser. It is generally necessary to block the undiffracted light at the exit of the light modulator and pass only the diffracted light to the optical path. This can be done by placing a stop at the output of the modulator, or, because the diffracted and undiffracted light have different polarizations, a polarizer can be placed on the light source and another on the output of the modulator, suitably oriented so as to pass only the diffracted light.

In a preferred embodiment, the guided-wave scanner is composed of two sets of aluminum interdigital transducers that straddle a region of proton-exchanged lithium niobate. The scanner uses two sets of transducers to create surface acoustic waves that first deflect light horizontally, via Bragg diffraction, and then vertically by means of mode-conversion. The device achieves Bragg diffraction through a set of phased-array transducers that launch a holographic pattern of acoustic waves at the Bragg angle of the light traveling in the waveguide. Because these transducers each have several phase-shifted acoustic emitters, they are able to steer the acoustic pattern to meet the Bragg angle of light over an angular range corresponding to an acoustic bandwidth of 200 MHz per transducer. A second set of simple (not-phased) transducers creates a pattern of sound waves that meets light traveling in the waveguide "head-on." Over a particular range of acoustic frequencies, this collinear interaction can "bump" the light into a leaky mode via polarization-rotating mode conversion. This leaky-mode light passes through the waveguide interface and finally exits from the edge of the substrate. This second, collinear interaction can be used to scan light vertically over an angle corresponding to approximately 70 MHz of acoustic bandwidth. It will be clear to one of skill in the art of the invention that, while particular materials and structures are described for use in this embodiment, any of the many equivalent materials and structures known in the art will also be suitable and may be advantageously employed in the present invention. For example, there are many other materials besides lithium niobate that are known in the art to be suitable for guided-wave devices.

Figure 4:
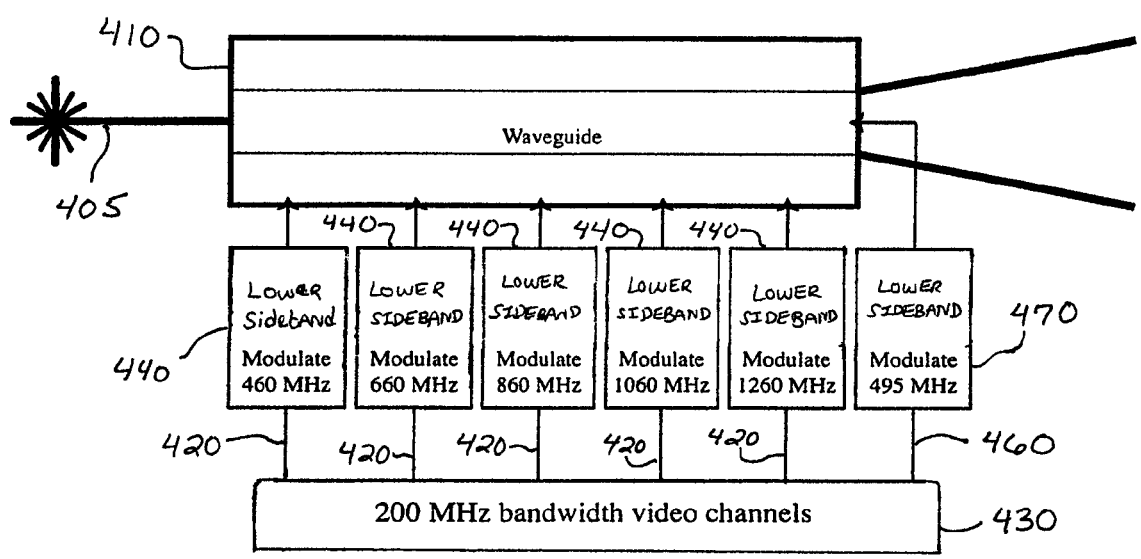
FIG. 4 is a schematic depicting how, in one aspect of a preferred embodiment of the present invention, a set of video channels controls horizontal diffraction of light passing through the guided-wave acousto-optic device and another provides vertical diffraction.

FIG. 4 is a schematic depicting how, in a preferred embodiment of the guided-wave scanner of the present invention, multiple video channels control horizontal diffraction of light 405 passing through waveguide 410 and another channel provides vertical diffraction. As shown in FIG. 4, each of five horizontal transducers has a bandwidth of 200 MHz and a center frequency of (200n+160) MHz for $1 \leq n \leq 5$. In each case, one of the video channels 420 taken from graphics processor 430, which has a 400 MHz pixel clock and thus the signals have a 200 MHz bandwidth, is upconverted 440 to a lower-single-sideband by any of the many means well known in the art. Vertical transducer 460 has a bandwidth of 70 MHz and a center frequency of 460 MHz, so lower-single-sideband carrier frequency 470 is set to 495 MHz. Rendering for this display is very similar to the method discussed in V. M. Bove, Jr., W. J. Plesniak, T. Quentmeyer, and J. Barabas, "Real-Time Holographic Video Images with Commodity PC Hardware," Proc. SPIE Stereoscopic Displays and Applications, 5664A, 2005, though here each channel does not represent a separate scan line, but rather all channels must carry different frequency ranges (and thus different diffraction angles) for the same scan line. It will be clear to one of skill in the art of the invention that many other frequencies and many other ways of generating the required single-sideband video signals are known in the art and are suitable for use in the present invention.

A preferred embodiment of the guided-wave scanner is constructed by proton exchanging a region of the $LiNbO_3$ substrate to create a surface waveguide and then patterning transducers. The proton exchange step is usually accomplished by masking the substrate with $SiO_2$, and then immersing the substrate in a >200° C. melt of benzoic acid for a time period ranging from a few minutes to a few hours, depending on the desired waveguide depth. In this case, the substrate is immersed in a 250° C. melt for 30 minutes for a waveguide depth of approximately 1 micron. Finally, the $SiO_2$ mask is removed and aluminum transducers are photolithographically placed on the proton exchanged $LiNbO_3$ substrate using a negative resist lift-off process. More details regarding the device fabrication process may be found in D. E. Smalley, "Integrated Optics for Holographic Video," M. Eng. Thesis, Massachusetts Institute of Technology, Cambridge Mass., 2006. Several iterations of guided-wave scanner design have been fabricated and tested, and device testing indicates that these devices meet the target requirements for the display system.

As previously discussed, the optics preferably comprise a Bravais lens system, a modified telephoto Fourier transform system, two holographic optical elements (HOEs), a demagnifying transform lens, and a vertical scanning subsystem. The Bravais system magnifies the guided-wave scanner's vertical scan angle while forcing the scan to still appear to come from the guided-wave scanner location. This provides vertical magnification without the need to relay the horizontal image, thereby maintaining the overall optical path length. This also means that the horizontal and vertical images of the object remain collocated and the horizontal and vertical optical paths do not need to be handled separately, permitting the use of spherical lenses instead of separate cylindrical lenses for each axis. The typical Bravais system will cause a collimated input beam to diverge, so the Bravais system is modified so that the beam remains collimated. A field lens is placed at/near the scanning plane to counteract the beam divergence, reducing the vertical collimated beam height and thereby recollimating the output beam, while not affecting the scanner's vertical scan angle. In operation, the light emitted from the guided-wave scanner first passes through the modified Bravais system in order to magnify the guided-wave scanner's vertical scan angle by 10×, forcing the scan to appear to come from the guided-wave scanner's position. As a consequence of this effect (and unlike in Mark II), the horizontal and vertical scans both appear to emanate from the same location The light then passes to the modified telephoto Fourier transform lens system.

In the preferred embodiment, the modified telephoto Fourier transform system converts the linear motion of the traveling diffraction fringe pattern into rotational motion that can be descanned by the horizontal scanner, thereby allowing the fringes to be descanned later by an optical element that creates a reverse rotation. The telephoto system is modified from a typical system in order to reduce the overall length of the optical path for efficient physical packaging of the system. A telephoto arrangement with multiple elements is used, since a single lens does not have a sufficient focal length. A typical telephoto arrangement of a separated diverging and converging pair of lenses, when compared to a single lens of the same effective focal length, has a decreased front focal length but a greatly increased back focal length. The overall optical path length of a telephoto arrangement from object to image is much larger than the overall path length of the corresponding single lens. A field lens is therefore added to the typical telephoto arrangement to reduce the back focal length, thereby making the optical system compact. The addition of the field lens at/near the object reduces the back focal length of the telephoto arrangement, but leaves its effective focal length the same. The telephoto arrangement also reduces the front focal distance and allows fine-tuning of the focal length by adjusting the spacing between the telephoto elements.

In the preferred embodiment, the optics also include HOEs that work in conjunction with the guided-wave scanner's vertical scan capability to scan the guided-wave scanner aperture, making stationary and tracking the holographic fringes without moving parts. Since the holo-line is horizontal parallax only, no image information is carried vertically, and the vertical direction can be temporarily used to encode the desired guided-wave scanner's aperture position along the holo-line. The first HOE simultaneously scans the guided-wave scanner aperture, which is narrower than a full holo-line. The first HOE is designed so that the amount of horizontal deflection varies continuously with vertical position (analogous to a mirror with a helical surface, but transmissive rather than reflective). The guided-wave scanner's aperture is scanned vertically onto the HOE, and the HOE then scans the aperture horizontally. The vertical scan rate, and therefore the horizontal scan speed, is adjusted to track the motion of the holographic fringes rendering them stationary. The HOE is followed by a transform lens in order to convert the rotational scan of the guided-wave scanner aperture into a linear motion and form a holo-line. The transform lens also magnifies the holo-line's field of view. A second HOE then s the vertical encoding (vertical scan component) introduced earlier by the guided-wave scanner's vertical scanner. This solid-state scanning feature results in a more robust, inexpensive, and scalable system than designs using the traditional Scophony solution of moving mirrors.

The prototype system is designed for operation with 510-532 nm semiconductor laser illumination. In the prototype, a complete, packaged monochrome display system is capable of being driven by one (dual-output) PC video card. The target specifications for the first system were 440 scan lines, 30 Hz, 24° view angle, 80 mm×60 mm×80 mm (W×H×D) view volume, and approximately 1.5 m total optical path length, folded to fit into a relatively shallow box. Further generations of this design increase the view volume and view angle, and add full color.

In the prototype, a single NVIDIA Quadro FX 4500 graphics processor performs the rendering and fringe computations and generates the video signals for the Mark III display. Mark III treats six video lines of 4096 samples as a single holo-line of 24,576 samples, and thus must divide the horizontal sync signal by six before using it to advance the position of the vertical scanner. Because the prototype display is monochrome, the dual RGB outputs of the graphics chip are treated as six independent frame buffers operating with 400 MHz pixel clock (and thus 200 MHz of bandwidth). Five of these channels drive the horizontal transducers of the GWS with the image information for each holo-line, and the sixth drives the vertical transducer with a fixed pattern on each holo-line consisting of a sinusoid whose frequency linearly increases from the beginning of the holo-line to the end. The starting frequency and chirp rate of this sinusoid can be changed in software to adjust the "horizontal hold" implemented by the HOE discussed in the preceding section.

While a specific preferred embodiment is disclosed herein, it will be clear to one of ordinary skill in the art that many variations on the architecture of the preferred embodiment described herein are suitable and may be advantageously employed in the present invention. For example, the light source needs only to be monochromatic rather than coherent, so it does not need to be a laser; it could be, for example, but not limited to, a gas-discharge tube, an LED, or a filtered incandescent or arc source. The illumination laser may be fabricated on-chip. Light may be coupled, for example, via a grating coupler, end- or butt-coupled, or evanescently, such as with prisms. The system can provide full color by employing red, green, and blue light sources simultaneously or by employing a light source having a color that changes over time. The device may integrate nonlinear elements, such as, but not limited to, a sum/difference amplifier or an Optical Parametric Amplifier/Generator for on-chip Red, Green and Blue creation from some other wavelength or wavelengths.

There may further be several light modulator devices in a stack to handle multiple light sources, or a single faster one may be used to cycle through multiple light sources over time. The laser or other light source may be integrated with the modulator in a single unit. The light modulator may have several guided-wave devices in a single substrate to make a wider screen (deflecting to a wider horizontal angle by having each device do an angular subsection of the screen). The devices may be stacked not just vertically, but also horizontally, and may be fabricated on the same chip. The chip may employ multiple light sources and the horizontal transducers need not be of different center frequency. Some, or all, of the geometric optics may be fabricated on the lithium niobate chip, including the horizontal and vertical scanners and polarizers. The vertical deflection may be created by a separate guided-wave scanning device from the device that creates the horizontal deflection, thus requiring two one-dimensional devices rather than a single two-dimensional device. The guided wave scanner may also be used for 2D or 1D projection. The waveguide may also be created by metal indiffusion, such as Ti or Zn indiffusion, by ion implantation, or by the deposition of, or growth of, another layer of material such as silicon dioxide or zinc oxide. It may also be created with laser or thermal modification of the surface via the photorefractive effect. The waveguide may also be created by metal indiffusion, such as Ti or Zn indiffusion, by ion implantation, or by the deposition of, or growth of, another layer of material such as silicon dioxide or zinc oxide. It may also be created with laser or thermal modification of the surface via the photorefractive effect.

Further, there are a broad range of ways to generate the video signals other than by using a graphics chip. The RF modulation may not be done in analog after the video signal generation, but rather the signals may be generated directly at appropriate RF frequencies. There might not be multiple video inputs to the horizontal scanner at different center frequencies, but rather a single one with a wider frequency range.

There are also alternate lens arrangements that would work—the preferred embodiment being an attempt to optimize for total path length. There are therefore many other ways known in the art to build the optical path, including through the use of convex and concave mirrors. For example, the first holographic optical element may be a helical mirror instead. The second holographic optical element may also not be necessary, replacing it instead with a simple vertical diffuser. The HOE may be a volume hologram. The input light in that case may be angularly multiplexed instead of vertically multiplexed.

The horizontal scanner may be a helical mirror (reflective), a twisted prism (transmissive), or a set of orthogonally crossed concave and convex lenses (or mirrors). The horizontal scanners may be either continuous or discrete. The horizontal scanner may be a diffractive or holographic optical element (DOE or HOE). This HOE would be a grating of vertically varying pitch. The resulting optical element would appear to be a family of hyperbolas with their asymptotes on the major axes. The phase of the HOE's grating can also be vertically varying (perhaps randomly varying), thereby reducing the effect of the inherent cross-coupled scanning behavior of the horizontal scanner. The HOE may be produced optically (interfering diverging and converging beams) or computationally. A multiplicity of scanners may be used in a horizontal arrangement to reduce the effects of the inherent cross-coupled scanning behavior of the horizontal scanner. The horizontal scanner may be a horizontal parallax only (HPO) hologram of the above-mentioned scanners, thereby removing the inherent cross-coupled scanning behavior. The traditional optical arrangement for producing hpo holograms is modified using a vertical (elliptical) diffuser either in front of (preferred) or behind the physical horizontal scanner. The HOE's grating may be computationally Fourier-filtered to remove the inherent cross-coupled scanning behavior. These apply to the second scanner (located at the first AOM image plane to descan the AOM's vertical multiplexing) as well. The second scanner may be a masked elliptical diffuser.

The inherent cross-coupling behavior in the horizontal scanner may be removed by relaying the horizontal component of the beam (for example, using a 4f cylindrical lens system), while reflecting (flipping or inverting) the beam's vertical component at the 4 f system's transform plane onto a second helical mirror. The relaying of the horizontal component of the beam causes the output horizontal scan angle to be doubled, while the retroreflecting of the beam's vertical component causes the output vertical deflection to be removed. Reflection of the beam's vertical component can be achieved with a negative index of refraction metamaterial, a volume hologram, or be approximated by a stack of spaced horizontal mirrors. A vertical stack of vertical only retroreflectors can be placed at the transform plane of the 4 f system, thereby removing the need for the second lens of the 4 f system and the second helical mirror. These vertical only retroreflectors may be microcorner reflectors (two long mirrors oriented at right angles) or microrods embedded in a matrix where the index of refraction of the microrods are twice that of the matrix or a single rod surrounded by a cylindrical mirror such that the focal point of the cylindrical mirror is coincident with the axis of the rod or a vertical stack of such rods.

Horizontal scanning may alternatively be performed using cross-fired surface acoustic waves (SAW) instead of using an HOE. The saturation of the output light may be controlled via piezo elements on an input fiber or by an on-chip electro-optic modulator or by any of the acousto-optic modulators. The chip may be elongated and the SAW transducers replicated to create pixels and then used without needing horizontal derotation by either pulsing the laser or by using a continuous laser that is gated by electro-optic modulators behind every pixel, so that the light duty cycle is multiplied by N, where N is the number of pixels. The basis fringes may be hard wired into the horizontal transducers. The SAW device may utilize other types of surface or near-surface waves including SH-SAW, Love Waves or leaky SAW waves. The X-cut, Y-cut or Z-cut of lithium niobate may be used. The exchange technique may be PE, DMPE, APE, SPE, RPE, HTPE, TIPE, DE, TIDE, or any combination.

In alternate configurations, the vertical scanner may be electronic, such as, but not limited to a micro-electromechanical (MEMS) device, rather than being a galvanometer. The vertical scanner may be a motor synchronized with the video timing. The vertical scanner may use a prism or mirrored polygon instead of a flat mirror. The vertical scan may be used to mode-convert light into guided modes, leaky modes, or into freespace modes. Freespace modes would not have the same bandwidth limitations as leaky modes. The vertical scanner may be collocated/near the horizontal scanner, thereby removing the separate vertical scanning section and reducing overall length. The vertical scanner may be a paddle type, so that although the vertical scanner is displaced from the horizontal scanner, the vertical scanner's effective center of scan is collocated with the horizontal scanner. Continuous or discrete mirrors or prisms may be used in conjunction with the diffuser to reduce the diffusion angle required, providing morelight throughput. The display may be used to write a pattern onto an OASLM that serves as the final output surface. The display may be used to write the back of a photosensitive film or photosensitive surface, thereby creating a hardcopy hologram printer (or a 2D or 1D printer).

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A holographic video display system comprising:
   at least one monochromatic light source;
   a video signal generator;
   at least one guided-wave acousto-optic modulator for diffracting light received from the light source according to at least one video signal received from the video signal generator;
   a vertical scanning subsystem for rendering a holographic image; and an optical path for passing the diffracted light from the acousto-optic modulator to the vertical scanning subsystem, the optical path comprising:
a Bravais lens system;
a first Fourier transform lens system;
at least one holographic optical element or at least one stationary mirror of continuous helical shape; and
a second Fourier transform lens system.

2. The holographic video display system of claim 1, wherein the guided-wave acousto-optic modulator is a two-dimensional device.

3. The holographic video display system of claim 1, wherein the vertical scanning subsystem further comprises a galvanometric scanner.

4. The holographic video display system of claim 1, wherein the vertical scanning subsystem further comprises a motor.

5. The holographic video display system of claim 1, wherein the vertical scanning subsystem further comprises a micro-electromechanical scanner.

6. The holographic video display system of claim 1, further comprising a polarizer that blocks undiffracted light from exiting the guided-wave mosulator.

7. The holographic video display system of claim 1, wherein the first Fourier transform lens system is a telephoto lens system.

8. The holographic video display system of claim 1, wherein the second Fourier transform lens system performs demagnification.

9. The holographic video display system of claim 1, wherein the guided-wave acousto-optic modulator further comprises video signal inputs for multiple frequency bands.

10. The holographic video display system of claim 1, wherein the color of the monochromatic light source changes with time in order to create a time-sequential full-color display.

11. The holographic video display system of claim 1, wherein there are three monochromatic light sources, one light source each being red, blue, and green, and three guided-wave modulators, each guided-wave modulator receiving light from one of the three monochromatic light sources.

12. The holographic video display system of claim 1, wherein there are three monochromatic light sources, one light source each being red, blue, and green, and the guided-wave modulator sequentially cycles through receiving light from each of the three monochromatic light sources.

13. A holographic video image produced using the display of claim 1.

14. A method for generating a holographic image, comprising:
providing monochromatic light to at least one guided-wave acousto-optic modulator;
diffracting the received light according to at least one video signal;
scanning the aperture of the guided-wave acousto-optic modulator to produce a holo-line;
undoing the motion of the diffraction pattern to render the holo-line stationary;
demagnifying the guided-wave acousto-optic modulator aperture to create a wide field of view; and
tiling the holo-lines vertically to create the holographic image.

15. The method of claim 14, wherein the guided-wave acousto-optic modulator is a two-dimensional device.

16. The method of claim 14, wherein the step of tiling the holo-lines vertically is performed via a galvanometric scanner, motor, or micro-electromechanical scanner.

17. The method of claim 14, further comprising the step of using a polarizer to block undiffracted light exiting the guided-wave modulator.

18. The method of claim 14, wherein the step of demagnifying is performed via a Fourier transform lens system.

19. The method of claim 14, wherein the guided-wave acousto-optic modulator receives video signal inputs for multiple frequency bands.

20. The method of claim 14, further comprising the step of changing the color of the monochromatic light source with time in order to create a time-sequential full-color display.

21. The method of claim 14, wherein there are three monochromatic light sources, one light source each being red, blue, and green, and three guided-wave modulators, each guided-wave modulator receiving light from one of the three monochromatic light sources.

22. The method of claim 14, wherein there are three monochromatic light sources, one light source each being red, blue, and green, and further comprising the step of sequentially cycling the guided-wave modulator through receiving light from each of the three monochromatic light sources.

23. A holographic video display that employs the method of claim 14.

* * * * *